(12) United States Patent
Zhang et al.

(10) Patent No.: US 10,311,278 B2
(45) Date of Patent: Jun. 4, 2019

(54) METHOD FOR ENCRYPTING APPLICATION AND TERMINAL

(71) Applicant: GUANGDONG OPPO MOBILE TELECOMMUNICATIONS CORP., LTD., Dongguan (CN)

(72) Inventors: Haiping Zhang, Dongguan (CN); Zuopeng Wang, Dongguan (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 60 days.

(21) Appl. No.: 15/656,471

(22) Filed: Jul. 21, 2017

(65) Prior Publication Data
US 2017/0323146 A1 Nov. 9, 2017

Related U.S. Application Data

(63) Continuation of application No. PCT/CN2016/080573, filed on Apr. 28, 2016.

(30) Foreign Application Priority Data

Aug. 27, 2015 (CN) .......................... 2015 1 0542386

(51) Int. Cl.
*G06K 9/00* (2006.01)
*G06F 21/32* (2013.01)
*G06F 3/0481* (2013.01)
*H04L 9/32* (2006.01)

(52) U.S. Cl.
CPC ..... *G06K 9/00087* (2013.01); *G06F 3/04817* (2013.01); *G06F 21/32* (2013.01); *G06K 9/00892* (2013.01); *H04L 9/3231* (2013.01); *H04L 9/3247* (2013.01)

(58) Field of Classification Search
None
See application file for complete search history.

(56) References Cited

U.S. PATENT DOCUMENTS

2016/0314308 A1* 10/2016 Suzuki .............. H04M 1/72577

FOREIGN PATENT DOCUMENTS

| CN | 103577764 | A |   | 2/2014 |
|----|-----------|---|---|--------|
| CN | 103581378 | A | * | 2/2014 |
| CN | 104065790 | A |   | 9/2014 |
| CN | 104408357 | A |   | 3/2015 |
| CN | 104573485 | A |   | 4/2015 |
| CN | 104808912 |   | * | 7/2015 |
| CN | 104808912 | A |   | 7/2015 |

(Continued)

OTHER PUBLICATIONS

International Search Report (including English translation) issued in corresponding PCT Application No. PCT/CN2016/080573, dated Jun. 3, 2016, 4 pages.

*Primary Examiner* — Delomia L Gilliard
(74) *Attorney, Agent, or Firm* — Young Basile Hanlon & MacFarlane, P.C.

(57) ABSTRACT

A method for encrypting an application and a related terminal may be provided. The method may include the follows. A pressure force of a touch operation performed on an icon of a target application is detected. First fingerprint information is obtained when the pressure force is greater than a preset pressure value. The target application is encrypted with the first fingerprint information.

20 Claims, 5 Drawing Sheets

(56) References Cited

FOREIGN PATENT DOCUMENTS

| | | | |
|---|---|---|---|
| CN | 104866352 A | 8/2015 | |
| CN | 105205374 A | 12/2015 | |
| CN | 106295286 | * 1/2017 | |
| WO | WO-2016192165 A1 | * 12/2016 | ............. G06F 21/32 |

* cited by examiner

METHOD FOR ENCRYPTING APPLICATION AND TERMINAL

CROSS REFERENCE TO RELATED APPLICATIONS

This application is a continuation of PCT Patent Application No. PCT/CN2016/080573, filed on Apr. 28, 2016, which claims priority to Chinese Patent Application No. 201510542386.3, filed on Aug. 27, 2015, contents of all of which are hereby incorporated by reference in their entireties.

TECHNICAL FIELD

The present disclosure relates to the field of communications technology, and in particular, to a method for encrypting an application and a terminal.

BACKGROUND

Diversified applications are emerging to meet different application requirements of users. The applications may include instant messaging applications, multimedia applications, reader applications, photographing applications, payment applications, and so on. After the applications are installed in an intelligent terminal (such as a smartphone or a Pad), a user of the intelligent terminal can use the applications to listen to music, watch movies, read a book, and so on, thereby enriching and facilitating user amateur life.

Currently, some applications in the intelligent terminal are usually encrypted to prevent theft of privacy information and property of the user of the intelligent terminal, and only when an encryption authentication passes, the encrypted application can be operated. To encrypt an application in the related art, the user generally needs to click an icon on a home interface of an intelligent terminal first to enter a setup interface, and then selects a security service option of the setup interface to enter a security management interface, and then selects an application encryption option of the security management interface to enter an application encryption interface. The user can then select one or more applications to be encrypted through the application encryption interface. Obviously, the above encryption manner is complicated and time-consuming.

SUMMARY

Embodiments of the present disclosure provide a method for encrypting an application and a terminal, which can quickly and conveniently encrypt an application.

According to a first aspect, a method for encrypting an application is provided. The method may include the follows. A pressure force of a touch operation performed on an icon of a target application is detected. First fingerprint information is obtained when the pressure force is greater than a preset pressure value. The target application is encrypted with the first fingerprint information.

According to a second aspect, a related terminal is also provided.

In the present disclosure, the terminal obtains the first fingerprint information entered by the touch operation when the pressure value of the touch operation is greater than the preset value, and encrypts the target application with the first fingerprint information. Therefore, the application can be encrypted quickly and conveniently.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Persons skilled in the art can derive other accompanying drawings according to the described accompanying drawings without creative efforts.

DETAILED DESCRIPTION OF ILLUSTRATED EMBODIMENTS

The technical solutions of embodiments of the present disclosure will be described clearly and completely in combination with the accompanying drawings of the embodiments of the present disclosure. Obviously, the described embodiments are merely a part of embodiments of the present disclosure, and not all of the embodiments. All other embodiments obtained by those skilled in the art without creative efforts based on the embodiments of the present disclosure shall fall within the protection scope of the present disclosure.

Embodiments of the present disclosure disclose a method for encrypting an application and a terminal, which can quickly and conveniently encrypt an application.

The method may include the follows. A pressure force of a touch operation performed on an icon of a target application is detected. First fingerprint information is obtained when the pressure force is greater than a preset pressure value. The target application is encrypted with the first fingerprint information.

Figure 1:
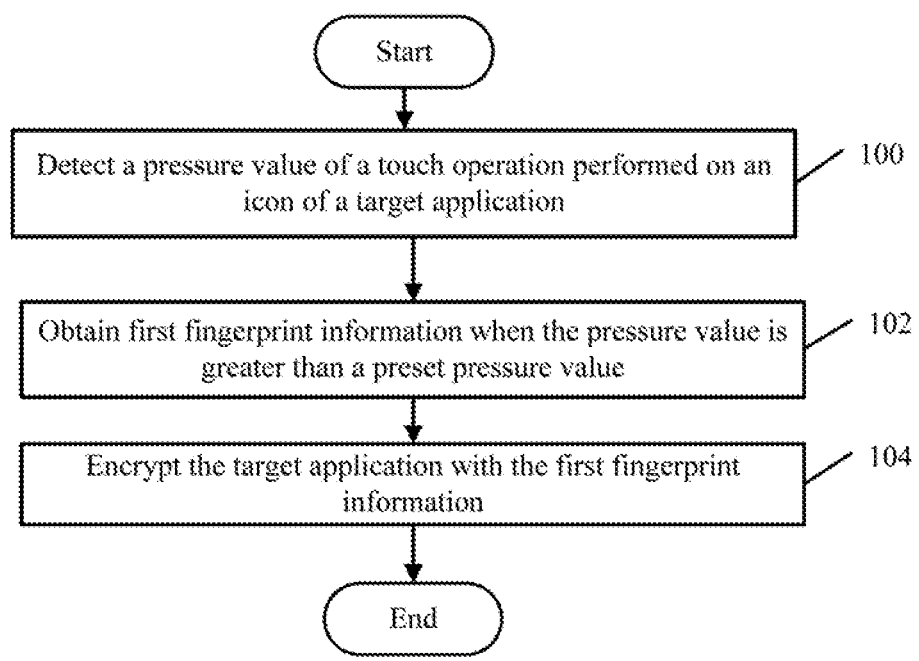
FIG. 1 is a flow chart of a method for encrypting an application according to an embodiment of the present disclosure.

FIG. 1 is a flow chart of a method for encrypting an application according to an embodiment of the present disclosure. As illustrate in FIG. 1, the method may include the follows.

At block 100, a terminal detects a pressure value of a touch operation performed on an icon of a target application.

In the embodiment, the terminal may be a terminal having a fingerprint recognition function and a pressure detection function, including but not limited to a smartphone, a tablet, a notebook computer, and a desktop computer. The operating system of the terminal may include but is not limited to an Android operating system, an iOS operating system, a Symbian operating system, a Black Berry operating system, a Windows operating system, and the like, and the present disclosure is not limited thereto.

In the embodiment, the target application is any application installed in the terminal, and the present disclosure is not limited thereto.

In the embodiment, the icon of the target application may be displayed on a desktop of the terminal, and the target application may be run when the icon of the target application is clicked.

In the embodiment, the terminal detects the touch operation performed on the icon of the target application. The touch operation may be but is not limited to a tap operation or a slide operation, and the present disclosure is not limited thereto. When the terminal detects that a touch operation is performed on the icon of the target application, the terminal detects the pressure value of the touch operation. The terminal may use a pressure sensor to detect the pressure value of the touch operation.

At block 102, the terminal obtains first fingerprint information entered by the touch operation when the pressure value is greater than a preset pressure value.

In at least one alternative embodiment, when the pressure value is greater than the preset pressure value, the terminal obtains the first fingerprint information. When the pressure value is less than or equal to the preset pressure value, the terminal further detects the pressure value of the touch operation until the finger of the user leaves the icon of the target application.

In at least one alternative embodiment, when the pressure value is greater than the preset pressure value, the terminal further detects the duration of the touch operation. When the duration of the touch operation is greater than the preset duration, the terminal obtains the first fingerprint information. When the duration of the touch operation is less than or equal to the preset duration, the terminal further detects the pressure value of the touch operation and detects the duration of the touch operation until the finger of the user leaves the icon of the target application.

By means of this implementation, when the pressure value is greater than the preset pressure value, and the duration of the touch operation is greater than the preset duration, the terminal obtains the first fingerprint information, which helps to reduce misoperations.

In the embodiment, the terminal uses a fingerprint sensor to obtain the first fingerprint information entered by the touch operation.

At block 104, the terminal encrypts the target application with the first fingerprint information.

In the embodiment, after obtaining the first fingerprint information, the terminal uses the first fingerprint information to encrypt the target application.

In the embodiment, after the terminal uses the first fingerprint information to encrypt the target application, if the user wants to operate the target application to realize an operation, the user needs to enter fingerprint information. The target application may be operated when the terminal verifies that the fingerprint information entered by the user matches with the first fingerprint information. For example, if the user wants to operate the target application, the user needs to enter the fingerprint information, and the terminal runs the target application when the terminal verifies that the fingerprint information entered by the user matches the first fingerprint information. If the user wants to operate the target application to realize a payment operation, the user needs to enter the fingerprint information, and the target application performs the payment operation when the terminal verifies that the fingerprint information entered by the user matches with the first fingerprint information.

For the method illustrated in FIG. 1, the terminal obtains the first fingerprint information entered by the touch operation when the pressure value of the touch operation is greater than the preset value, and encrypts the target application with the first fingerprint information. Therefore, the application can be encrypted quickly and conveniently.

Figure 2:
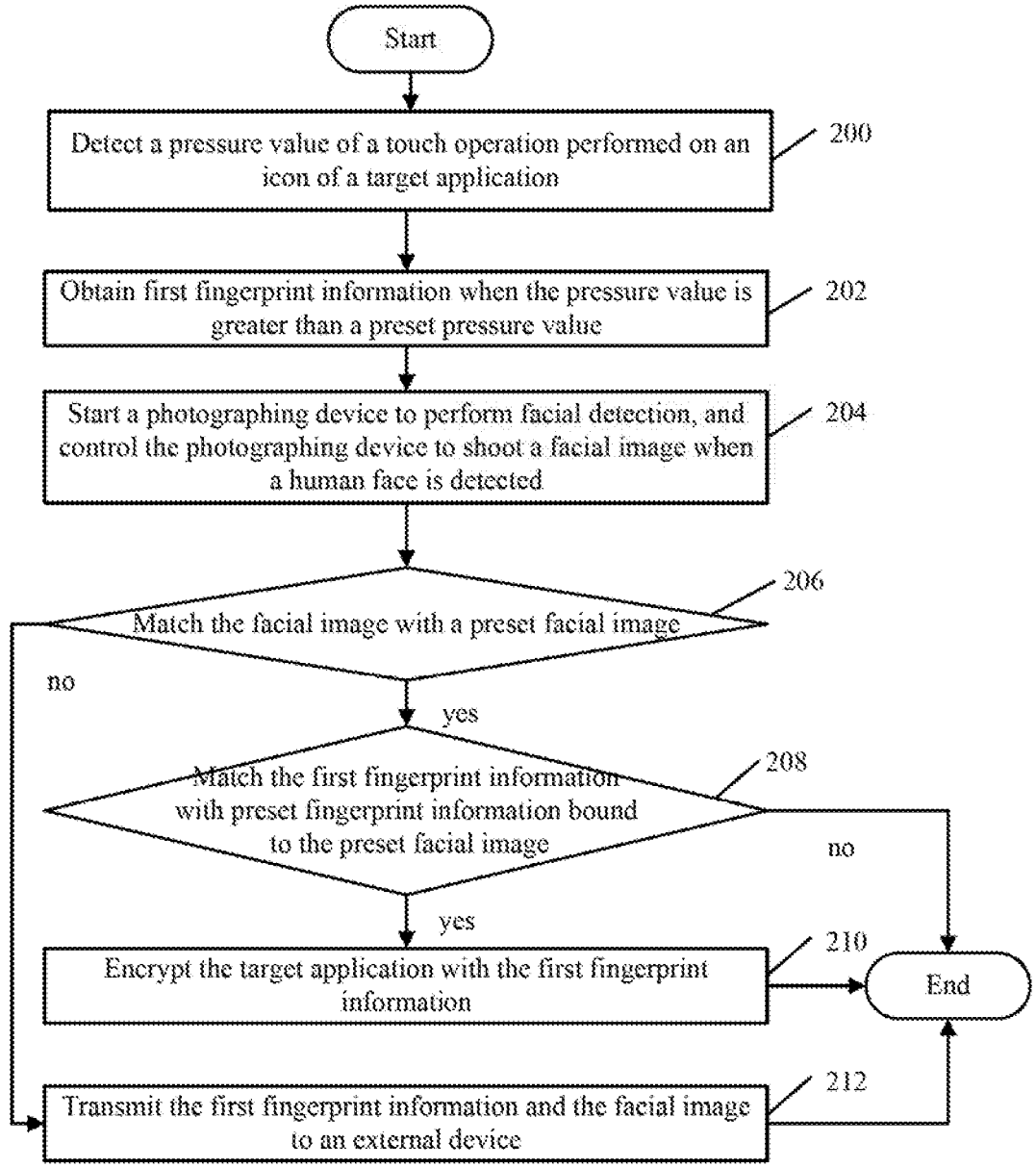
FIG. 2 is a flow chart of a method for encrypting an application according to another embodiment of the present disclosure.

FIG. 2 is a flow chart of a method for encrypting an application according to another embodiment of the present disclosure. As illustrate in FIG. 2, the method may include the follows.

At block 200, a terminal detects a pressure value of a touch operation performed on an icon of a target application. The operation at block 200 may correspond to the operation at block 100.

At block 202, the terminal obtains first fingerprint information entered by the touch operation when the pressure value is greater than a preset pressure value. The operation at block 202 may correspond to the operation at block 102.

At block 204, the terminal starts a photographing device to perform facial detection, and controls the photographing device to shoot a facial image when a human face is detected.

In the embodiment, after obtaining the first fingerprint information, the terminal starts the photographing device to perform facial detection. When a human face is detected, the photographing device is controlled to shoot a facial image.

At block 206, the terminal matches the facial image with a preset facial image. When the facial image matches with the preset facial image, proceed to block 208, otherwise, proceed to block 212.

In at least one alternative embodiment, when the facial image matches with the preset facial image, an operation of encrypting the target application with the first fingerprint information may be directly performed.

In the embodiment, one or more facial images may be stored in advance in the terminal, and the present disclosure is not limited thereto.

In practical application, the terminal may be lent to others. If others exert a great force to press the icon of the target application, the terminal may use others' fingerprint to encrypt the target application. In the embodiment, the user may set his/her own facial image as the preset facial image. After obtaining the first fingerprint information, the terminal may shoot a facial image of a user, and compare the shot facial image with the preset facial image, and subsequently perform the encryption operation when the shot facial image matches with the preset facial image. Therefore, by means of the embodiment, illegal users are prevented from arbitrarily encrypting the target application. The user may also set a facial image of a family member as the preset facial image. If a front-facing camera of the terminal is damaged or lacking, when the user stays together with the family member, the user can conveniently use a rear-facing camera to shoot the facial image of the family member to perform verification, thereby improving convenience of verifying the facial image.

At block 208, the terminal matches the first fingerprint information with preset fingerprint information bound to the preset facial image. When the first fingerprint information matches with the preset fingerprint information, proceed to block 210, otherwise, no operation is performed.

In the embodiment, the terminal may bind the preset facial image to the preset fingerprint information beforehand. One preset facial image may be bound to one or more pieces of preset fingerprint information, and one piece of preset fingerprint information may be bound to one or more preset facial images, and the present disclosure is not limited thereto.

In practical application, the user himself/herself may exert an excessive force unintentionally to press the icon of the target application, which may cause the terminal to encrypt the target application. In the embodiment, the user may preset the fingerprint information that can be used to encrypt the target application. The terminal uses the first fingerprint information to encrypt the target application only when the first fingerprint information obtained by the terminal matches the preset fingerprint information, thereby effectively preventing the terminal from encrypting the target application due to a mis-operation of the user.

At block 210, the terminal encrypts the target application with the first fingerprint information.

At block 212, the terminal transmits the first fingerprint information and the facial image to an external device.

In the embodiment, the external device may include but is not limited to a smartphone, a tablet, a notebook computer, and a desktop computer. The external device and the terminal may be used by a same user, or by different family members.

In the embodiment, when the terminal determines that the shot facial image does not match the preset facial image, the terminal transmits the first fingerprint information and the facial image to the external device. The terminal may transmit the first fingerprint information and the facial image to the external device by using a short messaging service application or an instant messaging application. After receiving the first fingerprint information and the facial image, the external device outputs prompt information that includes the first fingerprint information and the facial image, so as to prompt the user that an illegal user is trying to encrypt the target application of the terminal.

In practical application, the terminal may be stolen by a lawbreaker. In the embodiment, after the terminal determines that the facial image of the lawbreaker does not match the preset facial image, the terminal transmits fingerprint information and the facial image of the lawbreaker to the external device, and the external device outputs a prompt indicating that a lawbreaker is trying to encrypt the target application, so that the user of the external device can find the lawbreaker and the stolen terminal based on the fingerprint information and the facial image of the lawbreaker.

Figure 3:
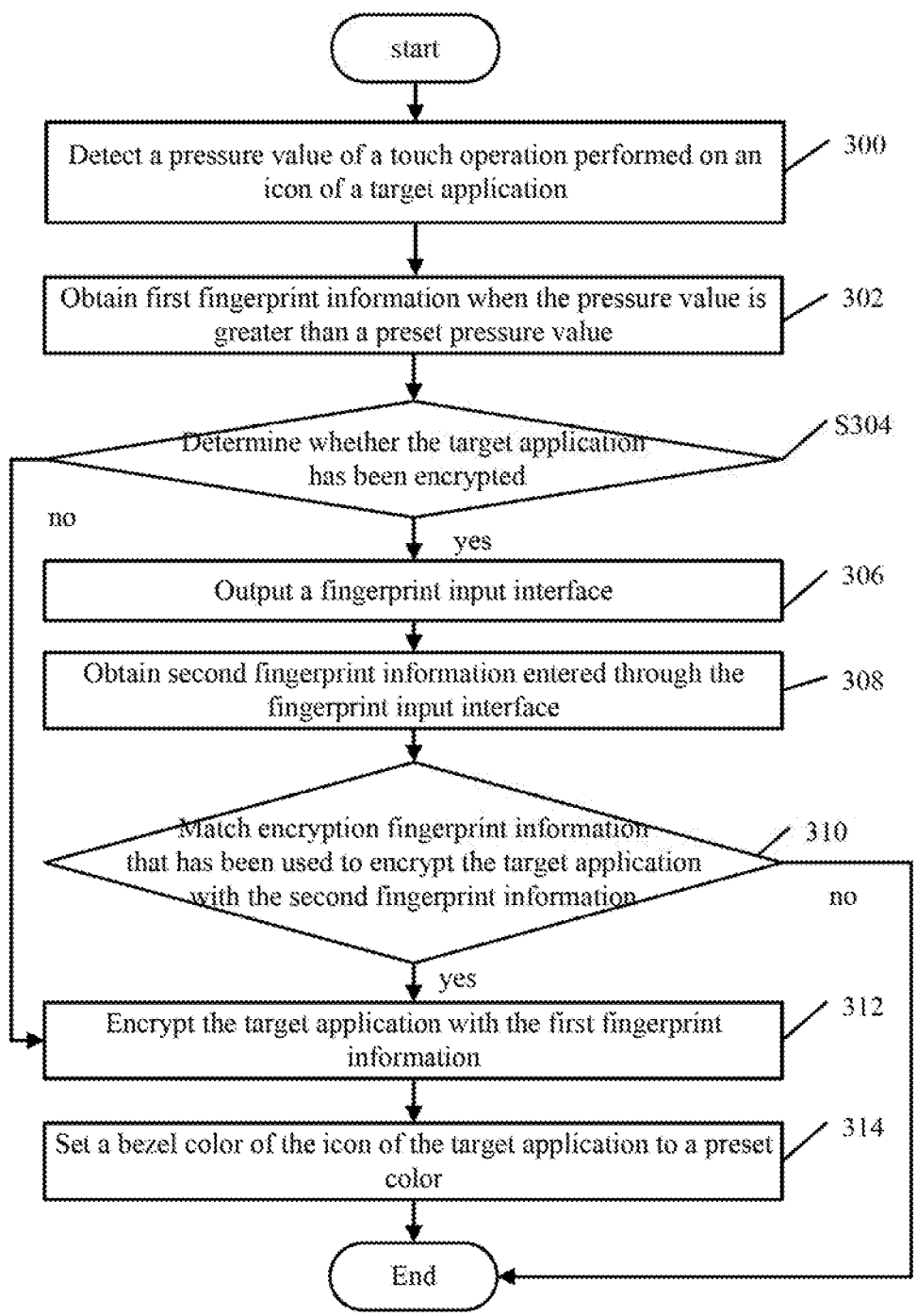
FIG. 3 is a flow chart of a method for encrypting an application according to yet another embodiment of the present disclosure.

FIG. 3 is a flow chart of a method for encrypting an application according to yet another embodiment of the present disclosure. As illustrated in FIG. 3, the method may include the follows.

At block 300, a terminal detects a pressure value of a touch operation performed on an icon of a target application. The operation at block 300 may correspond to the operation at block 100.

At block 302, the terminal obtains first fingerprint information entered by the touch operation when the pressure value is greater than a preset pressure value. The operation at block 302 may correspond to the operation at block 102.

At bock 304, the terminal determines whether the target application has been encrypted. When it is determined that the target application has been encrypted, proceed to block 306, otherwise, proceed to block 312.

At block 306, the terminal outputs a fingerprint input interface.

At block 308, the terminal obtains second fingerprint information entered through the fingerprint input interface.

In the embodiment, after the terminal outputs the fingerprint input interface, the user may perform a touch operation on the fingerprint input interface to input the second fingerprint information.

At block 310, the terminal matches encryption fingerprint information that has been used to encrypt the target application with the second fingerprint information. When it is determined that the encryption fingerprint information matches with the second fingerprint information, proceed to block 312, otherwise, no operation is performed.

In practical application, an illegal user may illegally tamper with the encryption fingerprint information that has been used to encrypt the target application. In the embodiment, when the user encrypts the target application that has been encrypted, the user needs to re-enter the encryption fingerprint information, and the terminal re-encrypts the target application only when the encryption fingerprint information is entered, thereby effectively preventing the illegal user from illegally tampering with the encryption fingerprint information that has been used to encrypt the target application.

At block 312, the terminal encrypts the target application with the first fingerprint information.

At block 314, the terminal sets a bezel color of the icon of the target application to a preset color.

In the embodiment, the preset color may be set to red, yellow, or green.

In the embodiment, after the terminal uses the first fingerprint information to encrypt the target application, the terminal sets the bezel color of the icon of the target application to the preset color, so that the user is prompted that the target application is an encrypted application. In this way, the user may know encryption status of the target application conveniently, and user experience is improved.

Figure 4:
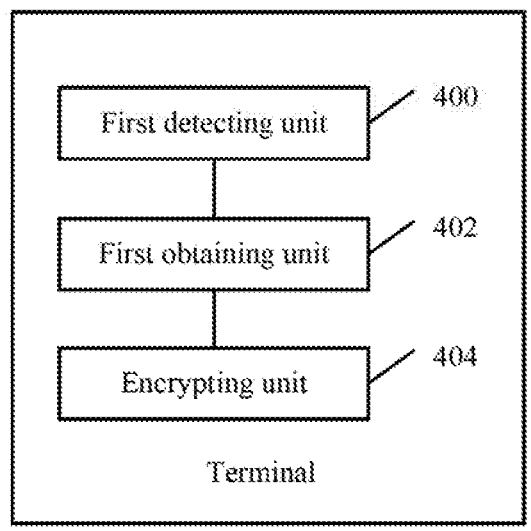
FIG. 4 is a structure diagram of a terminal according to an embodiment of the present disclosure.

FIG. 4 is a structure diagram of a terminal in accordance with an embodiment of the present disclosure. The terminal may include a first detecting unit 400, a first obtaining unit 402, and an encrypting unit 404.

The first detecting unit 400 may be configured to detect a pressure value of a touch operation performed on an icon of a target application.

In the embodiment, the terminal may be a terminal having a fingerprint recognition function and a pressure detection function, including but not limited to a smartphone, a tablet, a notebook computer, and a desktop computer. The operating system of the terminal may include but is not limited to an Android operating system, an iOS operating system, a Symbian operating system, a Black Berry operating system, a Windows operating system, and the like, and the present disclosure is not limited thereto.

In the embodiment, the target application is any application installed in the terminal, and the present disclosure is not limited thereto.

In the embodiment, the icon of the target application may be displayed on a desktop of the terminal, and the target application may be run when the icon of the target application is clicked.

In the embodiment, the first detecting unit 400 detects the touch operation performed on the icon of the target application. The touch operation may be but is not limited to a tap operation or a slide operation, and the present disclosure is not limited thereto. When the first detecting unit 400 detects that a touch operation is performed on the icon of the target application, the terminal detects the pressure value of the touch operation. The first detecting unit 400 may use a pressure sensor to detect the pressure value of the touch operation.

The first obtaining unit 402 may be configured to obtain first fingerprint information entered by the touch operation when the pressure value is greater than a preset pressure value.

In at least one alternative embodiment, when the pressure value is greater than the preset pressure value, the terminal obtains the first fingerprint information. When the pressure value is less than or equal to the preset pressure value, the terminal further detects the pressure value of the touch operation until the finger of the user leaves the icon of the target application.

In at least one alternative embodiment, the first detecting unit 400 further detects a duration of the touch operation when the pressure value is greater than the preset pressure value. When the duration of the touch operation is greater than a preset duration, the first obtaining unit 402 obtains the first fingerprint information. When the duration of the touch operation is less than or equal to the preset duration, the first detecting unit 400 further detects the pressure value of the touch operation and detects the duration of the touch operation until the finger of the user leaves the icon of the target application.

By means of this implementation, when the pressure value is greater than the preset pressure value, the first detecting unit 400 furthers detects the duration of the touch operation, and the first obtaining unit 402 obtains the first fingerprint information when the duration is greater than the preset duration, which helps to reduce mis-operations.

In the embodiment, the first obtaining unit 402 uses a fingerprint sensor to obtain the first fingerprint information entered by the touch operation.

The encrypting unit 404 may be configured to encrypt the target application with the first fingerprint information.

In the embodiment, after the first obtaining unit 402 obtains the first fingerprint information, the encrypting unit 404 uses the first fingerprint information to encrypt the target application.

In the embodiment, after the encrypting unit 404 uses the first fingerprint information to encrypt the target application, if the user wants to operate the target application to realize an operation, the user needs to enter fingerprint information. The target application may be operated when the terminal verifies that the fingerprint information entered by the user matches with the first fingerprint information. For example, if the user wants to operate the target application, the user needs to enter the fingerprint information, and the terminal runs the target application when the terminal verifies that the fingerprint information entered by the user matches the first fingerprint information. If the user wants to operate the target application to realize a payment operation, the user needs to enter the fingerprint information, and the target application performs the payment operation when the terminal verifies that the fingerprint information entered by the user matches with the first fingerprint information.

For the terminal illustrated in FIG. 4, the terminal obtains the first fingerprint information entered by the touch operation when the pressure value of the touch operation is greater than the preset value, and encrypts the target application with the first fingerprint information. Therefore, the application can be encrypted quickly and conveniently.

Figure 5:
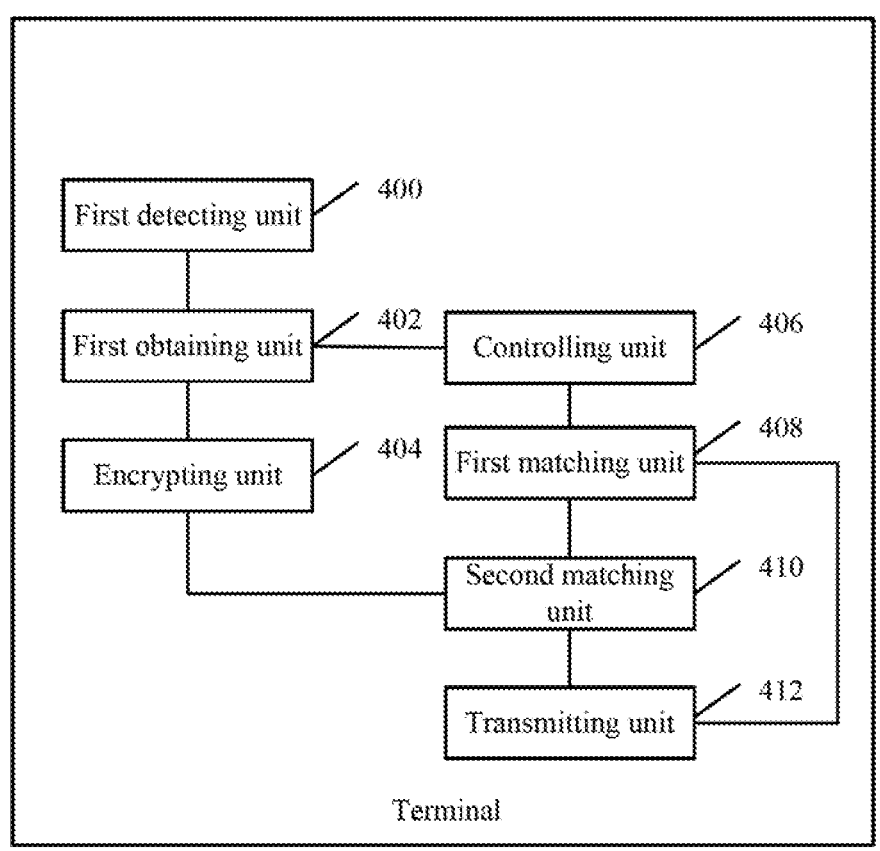
FIG. 5 is a structure diagram of a terminal according to another embodiment of the present disclosure.

FIG. 5 is a structure diagram of a terminal in accordance with another embodiment of the present disclosure. Besides the first detecting unit 400, the first obtaining unit 402, and the encrypting unit 404 of the terminal illustrated in FIG. 4, the terminal illustrated in FIG. 5 may further include a controlling unit 406, a first matching unit 408, a second matching unit 410, and a transmitting unit 412.

The first detecting unit 400 may be configured to detect a pressure value of a touch operation performed on an icon of a target application.

The first obtaining unit 402 may be configured to obtain first fingerprint information entered by the touch operation when the pressure value is greater than a preset pressure value.

The controlling unit 406 may be configured to start a photographing device to perform facial detection after the first obtaining unit 402 obtains the first fingerprint information, and control the photographing device to shoot a facial image when a human face is detected.

In the embodiment, after the first obtaining unit 402 obtains the first fingerprint information, the controlling unit 406 starts the photographing device to perform facial detection. When a human face is detected, the photographing device is controlled to shoot a facial image.

The first matching unit 408 may be configured to match the facial image with a preset facial image.

In the embodiment, one or more facial images may be stored in advance in the terminal, and the present disclosure is not limited thereto.

In practical application, the terminal may be lent to others. If others exert a great force to press the icon of the target application, the terminal may use others' fingerprint to encrypt the target application. In the embodiment, the user may set his/her own facial image as the preset facial image. After obtaining the first fingerprint information, the terminal may shoot a facial image of a user, and compare the shot facial image with the preset facial image, and subsequently perform the encryption operation when the shot facial image matches with the preset facial image. Therefore, by means of the embodiment, illegal users are prevented from arbitrarily encrypting the target application. The user may also set a facial image of a family member as the preset facial image. If a front-facing camera of the terminal is damaged or lacking, when the user stays together with the family member, the user can conveniently use a rear-facing camera to shoot the facial image of the family member to perform verification, thereby improving convenience of verifying the facial image.

The second matching unit 410 may be configured to match the first fingerprint information with preset fingerprint information bound to the preset facial image when the facial image matches with the preset facial image.

In the embodiment, the terminal may bind the preset facial image to the preset fingerprint information beforehand. One preset facial image may be bound to one or more pieces of preset fingerprint information, and one piece of preset fingerprint information may be bound to one or more preset facial images, and the present disclosure is not limited thereto.

In practical application, the user himself/herself may exert an excessive force unintentionally to press the icon of the target application, which may cause the terminal to encrypt the target application. In the embodiment, the user may preset the fingerprint information that can be used to encrypt the target application. The terminal uses the first fingerprint information to encrypt the target application only when the first fingerprint information obtained by the terminal matches the preset fingerprint information, thereby effectively preventing the terminal from encrypting the target application due to a mis-operation of the user.

The encrypting unit 404 may be configured to encrypt the target application with the first fingerprint information when the first fingerprint information matches with the preset fingerprint information bound to the preset facial image.

In at least one alternative embodiment, the encrypting unit 404 may be configured to encrypt the target application with the first fingerprint information when the facial image matches with the preset facial image.

The transmitting unit 412 may be configured to transmit the first fingerprint information and the facial image to an external device when the facial image does not match with the preset facial image.

In the embodiment, the external device may include but is not limited to a smart phone, a tablet, a notebook computer, and a desktop computer. The external device and the terminal may be used by a same user, or by different family members.

In the embodiment, when the shot facial image does not match the preset facial image, the terminal transmits the first fingerprint information and the facial image to the external device. The transmitting unit 412 may send the first fingerprint information and the facial image to the external device by using a short messaging service application or an instant messaging application. After receiving the first fingerprint information and the facial image, the external device outputs prompt information that includes the first fingerprint information and the facial image, so as to prompt the user that an illegal user is trying to encrypt the target application of the terminal.

In practical application, the terminal may be stolen by a lawbreaker. In the embodiment, when the facial image of the lawbreaker does not match the preset facial image, the terminal transmits fingerprint information and the facial image of the lawbreaker to the external device, and the external device outputs a prompt indicating that a lawbreaker is trying to encrypt the target application, so that the user of the external device can find the lawbreaker and the stolen terminal based on the fingerprint information and the facial image of the lawbreaker.

Figure 6:
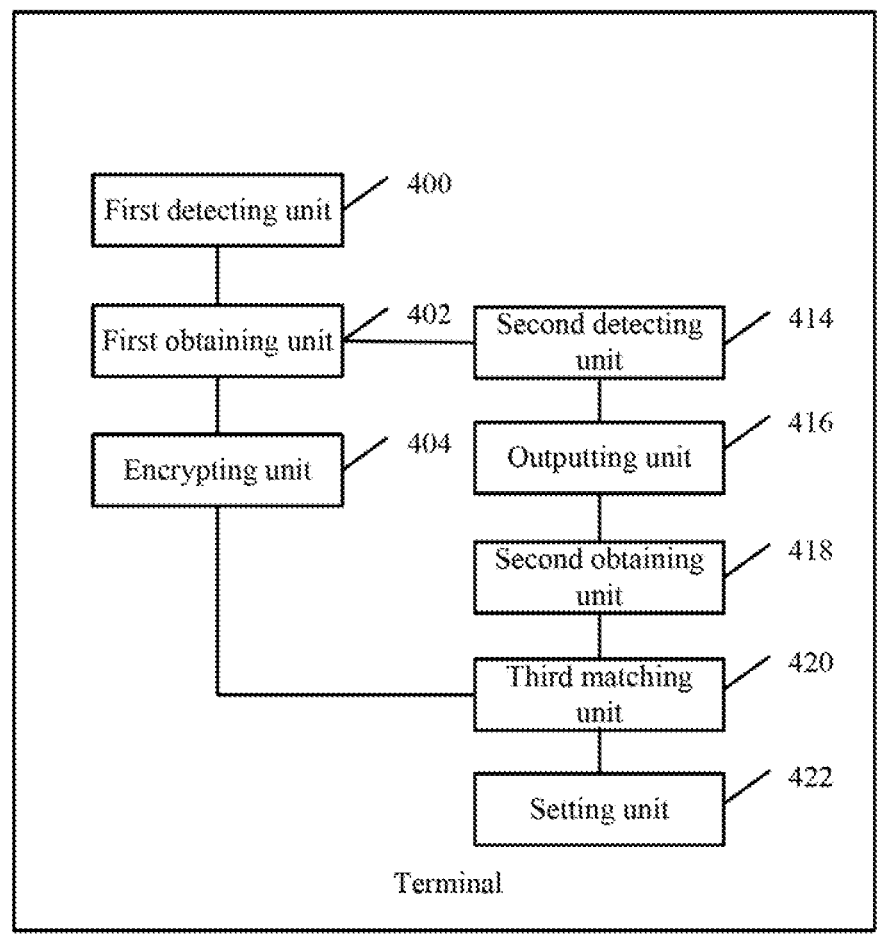
FIG. 6 is a structure diagram of a terminal according to yet another embodiment of the present disclosure.

FIG. 6 is a structure diagram of a terminal in accordance with yet another embodiment of the present disclosure. Besides the first detecting unit 400, the first obtaining unit 402, and the encrypting unit 404 of the terminal illustrated in FIG. 4, the terminal illustrated in FIG. 6 may further include a second detecting unit 414, an outputting unit 416, a second obtaining unit 418, a third matching unit 420, and a setting unit 422.

The first detecting unit 400 may be configured to detect a pressure value of a touch operation performed on an icon of a target application.

The first obtaining unit 402 may be configured to obtain first fingerprint information entered by the touch operation when the pressure value is greater than a preset pressure value.

The second detecting unit 414 may be configured to detect whether the target application has been encrypted after the first obtaining unit 402 obtains the first fingerprint information.

The outputting unit 416 may be configured to output a fingerprint input interface when it is detected that the target application has been encrypted.

The second obtaining unit 418 may be configured to obtain second fingerprint information entered through the fingerprint input interface.

In the embodiment, after the outputting unit 416 outputs the fingerprint input interface, the user may perform a touch operation on the fingerprint input interface to input the second fingerprint information.

The third matching unit 420 may be configured to match encryption fingerprint information that has been used to encrypt the target application with the second fingerprint information.

The encrypting unit 404 may be configured to encrypt the target application with the first fingerprint information when the encryption fingerprint information matches with the second fingerprint information.

In practical application, an illegal user may illegally tamper with the encryption fingerprint information that has been used to encrypt the target application. In the embodiment, when the user encrypts the target application that has been encrypted, the user needs to re-enter the encryption fingerprint information, and the terminal re-encrypts the target application only when the encryption fingerprint information is entered, thereby effectively preventing the illegal user from illegally tampering with the encryption fingerprint information that has been used to encrypt the target application.

The setting unit 422 may be configured to set a bezel color of the icon of the target application to a preset color.

In the embodiment, the preset color may be set to red, yellow, or green.

In the embodiment, after the encrypting unit 404 uses the first fingerprint information to encrypt the target application, the setting unit 422 sets the bezel color of the icon of the target application to the preset color, so that the user is prompted that the target application is an encrypted application. In this way, the user may know encryption status of the target application conveniently, and user experience is improved.

Figure 7:
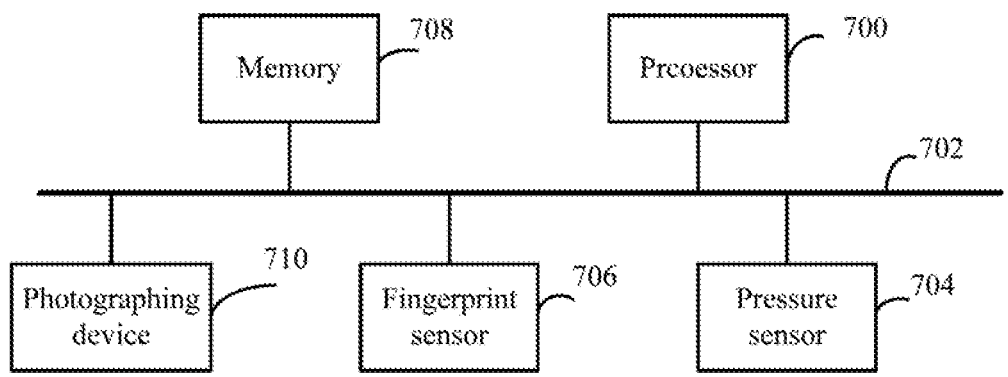
FIG. 7 is a structure diagram of a terminal according to yet another embodiment of the present disclosure.

FIG. 7 is a structure diagram of a terminal in accordance with an embodiment of the present disclosure. The terminal may include a processor 700, a pressure sensor 704 coupled to the processor 700 via a bus 702, a fingerprint sensor 706, and a memory 708. In at least one alternative embodiment, the terminal may further include a photographing device 710.

The memory 708 may be configured to store computer-executable program codes. The processor 700 may be configured to invoke the computer-executable program codes to perform following operations: detecting a pressure force of a touch operation performed on an icon of a target application; obtaining first fingerprint information when the pressure force is greater than a preset pressure value; and encrypting the target application with the first fingerprint information.

For the terminal illustrated in FIG. 7, the terminal obtains the first fingerprint information entered by the touch operation when the pressure value of the touch operation is greater than the preset value, and encrypts the target application with the first fingerprint information. Therefore, the application can be encrypted quickly and conveniently.

In at least one alternative embodiment, the first fingerprint information may be obtained via the fingerprint sensor 704.

In at least one alternative embodiment, the processor 700 may be further configured to invoke the computer-readable program codes to perform starting, after the first fingerprint information is obtained, the photographing device 710 to perform facial detection and controlling the photographing device 710 to shoot a facial image when a human face is detected. The processor 700 that is configured to perform encrypting the target application with the first fingerprint information may be further configured to perform encrypting the target application with the first fingerprint information when the facial image matches with a preset facial image.

In at least one alternative embodiment, the processor 700 may be further configured to invoke the computer-readable program codes to perform matching the first fingerprint information with preset fingerprint information bonded to the preset facial image when the facial image matches with the preset facial image. The processor 700 that is configured to perform encrypting the target application with the first fingerprint information may be further configured to perform encrypting the target application with the first fingerprint information when the first fingerprint information matches with the preset fingerprint information bonded to the preset facial image.

In at least one alternative embodiment, the processor 700 may be further configured to invoke the computer-executable program codes to transmit the first fingerprint information and the facial image to an external device when the facial image does not match with the preset facial image, whereby the external device outputs prompt information. The prompt information may include the first fingerprint information and the facial image, and may be configured to prompt an illegal encryption.

In at least one alternative embodiment, the processor 700 may be further configured to invoke the computer-readable program codes to perform following operations: outputting a fingerprint input interface when it is determined, after the first fingerprint information is obtained, that the target application has been encrypted; obtaining second fingerprint information entered through the fingerprint input interface; and matching encryption fingerprint information that has been used to encrypt the target application with the second fingerprint information. The processor 700 that is configured to perform encrypting the target application with the first fingerprint information is further configured to perform encrypting the target application with the first fingerprint information when the encryption fingerprint information matches with the second fingerprint information.

In at least one alternative embodiment, the processor 700 may be further configured to invoke the computer-readable program codes to perform setting a bezel color of the icon of the target application to a preset color after encrypting the target application.

What needs to be illustrated is that in the foregoing embodiments, descriptions of each embodiment are emphasized respectively, and parts which are not elaborated in a certain embodiment may subject to relevant descriptions of other embodiments. Secondly, a person skilled in the art shall know that embodiments described in the specification are preferable embodiments, and related actions and units may not be necessary for the present disclosure.

According to actual needs, sequences of operations in the method embodiments of the present disclosure may be adjusted, some operations may be combined, and some operations may be deleted.

According to actual needs, some units of the terminal of the present disclosure may be combined, divided, or deleted.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or CD, and so on.

The foregoing has described in detail a method for encrypting an application and a terminal disclosed in the embodiments of the present disclosure. The principles and implementation of the present disclosure are described herein through specific examples. The description about the embodiments of the present disclosure is merely provided to help to understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limitation of the present disclosure.

What is claimed is:

1. A method for encrypting an application, comprising:
acquiring a pressure force of a touch operation performed on an icon of a target application;
obtaining first fingerprint information entered by the touch operation when the pressure force is greater than a preset pressure value; and
encrypting the target application with the first fingerprint information.

2. The method of claim 1, further comprising:
starting, after the first fingerprint information is obtained, a photographing device to perform facial detection, and controlling the photographing device to shoot a facial image when a human face is detected;
wherein encrypting the target application with the first fingerprint information comprises:
encrypting the target application with the first fingerprint information when the facial image matches with a preset facial image.

3. The method of claim 2, further comprising:
matching the first fingerprint information with preset fingerprint information bonded to the preset facial image when the facial image matches with the preset facial image;
wherein encrypting the target application with the first fingerprint information comprises:
encrypting the target application with the first fingerprint information when the first fingerprint information matches with the preset fingerprint information bonded to the preset facial image.

4. The method of claim 2, further comprising:
transmitting the first fingerprint information and the facial image to an external device when the facial image does not match with the preset facial image, whereby the external device outputs prompt information, wherein the prompt information comprises the first fingerprint information and the facial image, and is configured to prompt an illegal encryption.

5. The method of claim 1, further comprising:
outputting a fingerprint input interface when it is determined, after the first fingerprint information is obtained, that the target application has been encrypted;
obtaining second fingerprint information entered through the fingerprint input interface; and
matching encryption fingerprint information that has been used to encrypt the target application with the second fingerprint information;
wherein encrypting the target application with the first fingerprint information comprises:
encrypting the target application with the first fingerprint information when the encryption fingerprint information matches with the second fingerprint information.

6. The method of claim 1, further comprising:
setting a bezel color of the icon of the target application to a preset color after encrypting the target application.

7. A terminal comprising:
a memory configured to store computer-readable program codes; and a processor configured to invoke the computer-readable program codes to perform following operations:
acquiring a pressure force of a touch operation performed on an icon of a target application;
obtaining first fingerprint information entered by the touch operation when the pressure force is greater than a preset pressure value; and
encrypting the target application with the first fingerprint information.

8. The terminal of claim 7, wherein the processor is further configured to invoke the computer-readable program codes to perform:
starting, after the first fingerprint information is obtained, a photographing device to perform facial detection, and controlling the photographing device to shoot a facial image when a human face is detected;
wherein the processor that is configured to perform encrypting the target application with the first fingerprint information is further configured to perform:
encrypting the target application with the first fingerprint information when the facial image matches with a preset facial image.

9. The terminal of claim 8, wherein the processor is further configured to invoke the computer-readable program codes to perform:
matching the first fingerprint information with preset fingerprint information bonded to the preset facial image when the facial image matches with the preset facial image;
wherein the processor that is configured to perform encrypting the target application with the first fingerprint information is further configured to perform:
encrypting the target application with the first fingerprint information when the first fingerprint information matches with the preset fingerprint information bonded to the preset facial image.

10. The terminal of claim 8, wherein the processor is further configured to invoke the computer-readable program codes to perform:
transmitting the first fingerprint information and the facial image to an external device when the facial image does not match with the preset facial image, whereby the external device outputs prompt information, wherein the prompt information comprises the first fingerprint information and the facial image, and is configured to prompt an illegal encryption.

11. The terminal of claim 7, wherein the processor is further configured to invoke the computer-readable program codes to perform following operations:
outputting a fingerprint input interface when it is determined, after the first fingerprint information is obtained, that the target application has been encrypted;
obtaining second fingerprint information entered through the fingerprint input interface; and
matching encryption fingerprint information that has been used to encrypt the target application with the second fingerprint information;
wherein the processor that is configured to perform encrypting the target application with the first fingerprint information is further configured to perform:
encrypting the target application with the first fingerprint information when the encryption fingerprint information matches with the second fingerprint information.

12. The terminal of claim 7, wherein the processor is further configured to invoke the computer-readable program codes to perform:
setting a bezel color of the icon of the target application to a preset color after encrypting the target application.

13. A non-transitory computer-readable storage medium storing computer program codes which, when executed by a processor, cause the processor to carry out following actions:
acquiring a pressure force of a touch operation performed on an icon of a target application;
detecting a duration of the touch operation when the pressure force is greater than a preset pressure value;
obtaining first fingerprint information entered by the touch operation when the duration of the touch operation is greater than a preset duration; and
encrypting the target application with the first fingerprint information.

14. The non-transitory computer-readable storage medium of claim 13, wherein the computer program codes are further executed by the processor to carry out actions, comprising:
starting, after the first fingerprint information is obtained, a photographing device to perform facial detection, and controlling the photographing device to shoot a facial image when a human face is detected;
wherein the computer program codes executed by the processor to carry out the action of encrypting the target application with the first fingerprint information are executed by the processor to carry out actions, comprising:
encrypting the target application with the first fingerprint information when it is determined that the facial image matches with a preset facial image.

15. The non-transitory computer-readable storage medium of claim 14, wherein the computer program codes are further executed by the processor to carry out actions, comprising:
matching the first fingerprint information with preset fingerprint information bonded to the preset facial image when the facial image matches with the preset facial image;
wherein the computer program codes executed by the processor to carry out of encrypting the target application with the first fingerprint information are executed by the processor to carry out actions, comprising:
encrypting the target application with the first fingerprint information when the first fingerprint information matches with the preset fingerprint information bonded to the preset facial image.

16. The non-transitory computer-readable storage medium of claim 14, wherein the computer program codes are further executed by the processor to carry out actions, comprising:
transmitting the first fingerprint information and the facial image to an external device when the facial image does not match with the preset facial image, whereby the external device outputs prompt information, wherein the prompt information comprises the first fingerprint information and the facial image, and is configured to prompt an illegal encryption.

17. The non-transitory computer-readable storage medium of claim 13, wherein the computer program codes are further executed by the processor to carry out actions, comprising:
outputting a fingerprint input interface when it is determined, after the first fingerprint information is obtained, that the target application has been encrypted;
obtaining second fingerprint information entered through the fingerprint input interface; and matching encryption fingerprint information that has been used to encrypt the target application with the second fingerprint information;

wherein the computer program codes executed by the processor to carry out of encrypting the target application with the first fingerprint information are executed by the processor to carry out actions, comprising:

encrypting the target application with the first fingerprint information when the encryption fingerprint information matches with the second fingerprint information.

18. The non-transitory computer-readable storage medium of claim 13, wherein the computer program codes are further executed by the processor to carry out actions, comprising:

setting a bezel color of the icon of the target application to a preset color after encrypting the target application.

19. The method of claim 1, wherein obtaining first fingerprint information entered by the touch operation when the duration of the touch operation is greater than a preset duration comprises:

detecting a duration of the touch operation when the pressure force is greater than a preset pressure value; and obtaining first fingerprint information entered by the touch operation when the duration of the touch operation is greater than a preset duration.

20. The terminal of claim 7, wherein the processor that is configured to perform obtaining first fingerprint information entered by the touch operation when the duration of the touch operation is greater than a preset duration is further configured to perform:

detecting a duration of the touch operation when the pressure force is greater than a preset pressure value; and obtaining first fingerprint information entered by the touch operation when the duration of the touch operation is greater than a preset duration.

\* \* \* \* \*